United States Patent [19]

Okamoto et al.

[11] Patent Number: 4,566,641

[45] Date of Patent: Jan. 28, 1986

[54] SHEET BREAKING APPARATUS

[75] Inventors: Magoji Okamoto, Nagoya; Norio Maekawa, Tokyo, both of Japan

[73] Assignee: NGK Insulators, Ltd., Nagoya, Japan

[21] Appl. No.: 379,477

[22] Filed: May 18, 1982

[30] Foreign Application Priority Data

May 22, 1981 [JP] Japan .................................. 56-76693

[51] Int. Cl.⁴ ............................................. B02C 13/20
[52] U.S. Cl. .................................... 241/200; 144/163;
144/187; 144/367; 241/230; 241/236
[58] Field of Search ............... 241/200, 230, 236, 238,
241/241, 242, 243; 83/508, 349; 144/162 R,
163, 187, 367

[56] References Cited

U.S. PATENT DOCUMENTS

| | | | |
|---|---|---|---|
| 1,448,013 | 3/1923 | Warren | 241/200 |
| 1,991,757 | 2/1935 | Lorentz | 241/236 X |
| 2,464,774 | 3/1949 | Keiper | 241/200 X |
| 2,497,985 | 2/1950 | Fowler | 241/200 X |
| 2,959,364 | 11/1960 | Anderson et al. | 241/200 |
| 3,396,914 | 8/1968 | Liebman | 241/236 X |
| 3,589,627 | 6/1971 | Torrence | 241/236 X |
| 3,790,093 | 2/1974 | McIntyre | 241/241 X |
| 3,863,850 | 2/1975 | Freeman | 241/236 X |
| 4,142,688 | 3/1979 | Johnson et al. | 241/243 X |

FOREIGN PATENT DOCUMENTS

| | | | |
|---|---|---|---|
| 2702177 | 7/1978 | Fed. Rep. of Germany | 241/236 |
| 57-39072 | 8/1982 | Japan . | |
| 5332 | 5/1921 | Netherlands | 241/236 |

Primary Examiner—Howard N. Goldberg
Assistant Examiner—Joseph M. Gorski
Attorney, Agent, or Firm—Parkhurst & Oliff

[57] ABSTRACT

A sheet breaking apparatus for breaking or cutting waste sheet materials according to the invention comprising a pair of endless band-like rotating body, one of which is driven downwardly or in a feeding direction of the sheet materials at a faster speed than that of the other rotating body driven upwardly in a direction opposite to the feeding direction, and cutting blades respectively fixedly arranged on the rotating bodies such that the cutting blades fixed to the downwardly driven rotating body are spaced apart with equal intervals respectively in longitudinal and transverse directions and the cutting blades fixed to the upwardly driven rotating body at least adjacent in the moving direction are not aligned with each other. With the arrangement, fibrous or soft synthetic resin sheets or the like difficult to be mechanically broken are easily and effectively cut or broken into small pieces to make easy next processes for burning, reclaiming or regenerating the waste materials.

2 Claims, 3 Drawing Figures

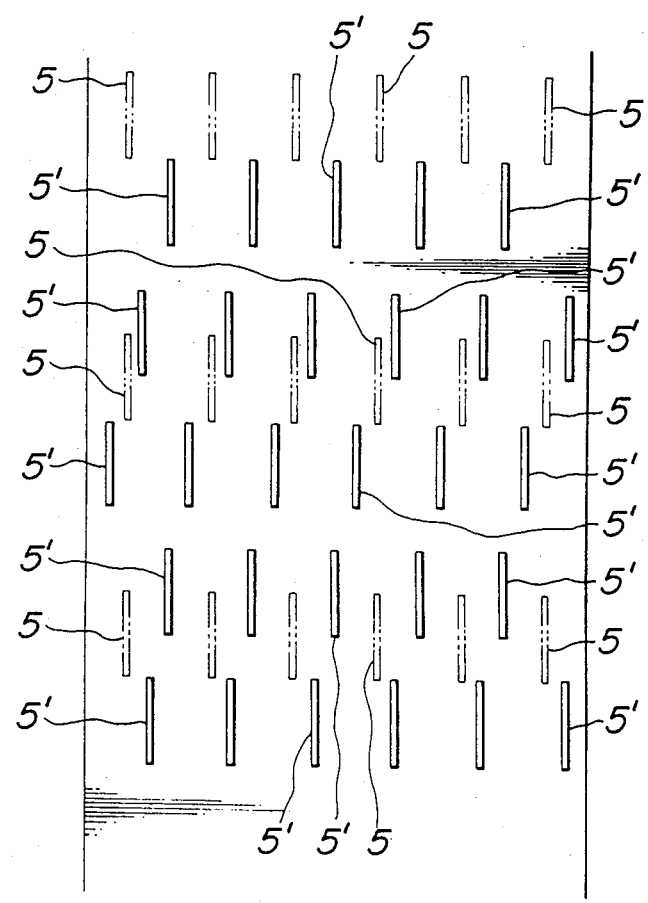

FIG_2b
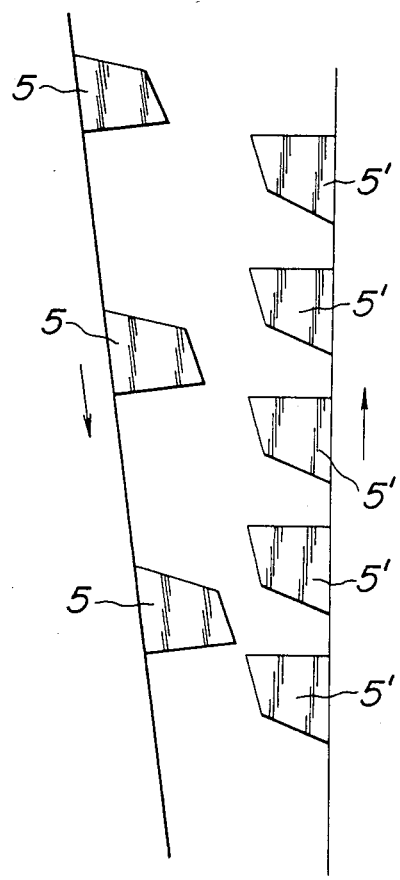

4,566,641

SHEET BREAKING APPARATUS

BACKGROUND OF THE INVENTION

1. Field of the Invention

This invention relates to a breaking apparatus for cutting and breaking waste materials such as fibrous or synthetic resin films, sheets or the like into suitably sized pieces.

2. Description of the Prior Art

Soft industrial waste materials such as sheets or bags of fibrous material, vinyl chloride, polyethylene or the like are cut into pieces of suitable sizes before they are burned or treated for reclamation or regeneration. Sheets, films, bags and the like tend to wind about the rotating blades of high speed cutting machines making it impossible to perform the cutting operation. Owing to this difficulty in cutting the waste materials by mechanical means, the cutting of sheets, films and bags into pieces is predominately performed by hand-operated tools such as knives, sickles and the like in very ineffective manner with low activity.

SUMMARY OF THE INVENTION

It is an object of the invention to provide an improved sheet breaking apparatus which overcomes the above disadvantages of the prior art, which can break or cut soft sheets and similar fibrous materials, or synthetic resins into suitably sized pieces, automatically and effectively without requiring any manual operation.

In order to accomplish the objects of the invnetion, the breaking apparatus for cutting and breaking sheet materials supplied thereto according to the invention, comprises a pair of endless band-like cutting rotating bodies which have pluralities of cutting blades fixed thereto, respectively, one of said rotating bodies being driven in a downward direction which is a feeding direction of said sheet materials at a velocity faster than that of the other of said rotating bodies driven in an upward direction opposite to the feeding direction of said sheet materials, said rotating bodies being arranged such that said cutting blades respectively fixed to the cutting rotating bodies are widely upwardly separated at upper portions of the cutting rotating bodies facing each other and at lower portions the rotating cutting bodies facing each other are aligned with one another when viewed in a transverse direction so as not to contact one another, said cutting blades fixed to the downward cutting rotating body driven in the feeding direction of said sheet materials being arranged spaced apart with substantially equal respective intervals in the feeding direction and a direction perpendicular thereto, said cutting blades fixed to the upward cutting rotating body driven in the direction opposite to the feeding direction of said sheet materials being arranged so as not to be aligned with each other between at least the cutting blades adjacent in said feeding direction; and stationary cutting blades arranged above said upper portion of said upward cutting rotating body driven in the direction opposite to the feeding direction of said sheet materials to be aligned with said cutting blades of said upward cutting rotating body as viewed in a transverse direction so as not to contact said cutting blades.

In order that the invention may be more clearly understood, preferred embodiments will be described, by way of example, with reference to the accompanying drawings.

BRIEF DESCRIPTION OF THE DRAWINGS

FIG. 2a illustrates one example of arrangement of cutting blades of rotating bodies of the apparatus according to the invention, and FIG. 2b illustrates relative positions between the cutting blades at a cutting zone of the apparatus according to the invention.

DETAILED DESCRIPTION OF THE PREFERRED EMBODIMENT

Figure 1:
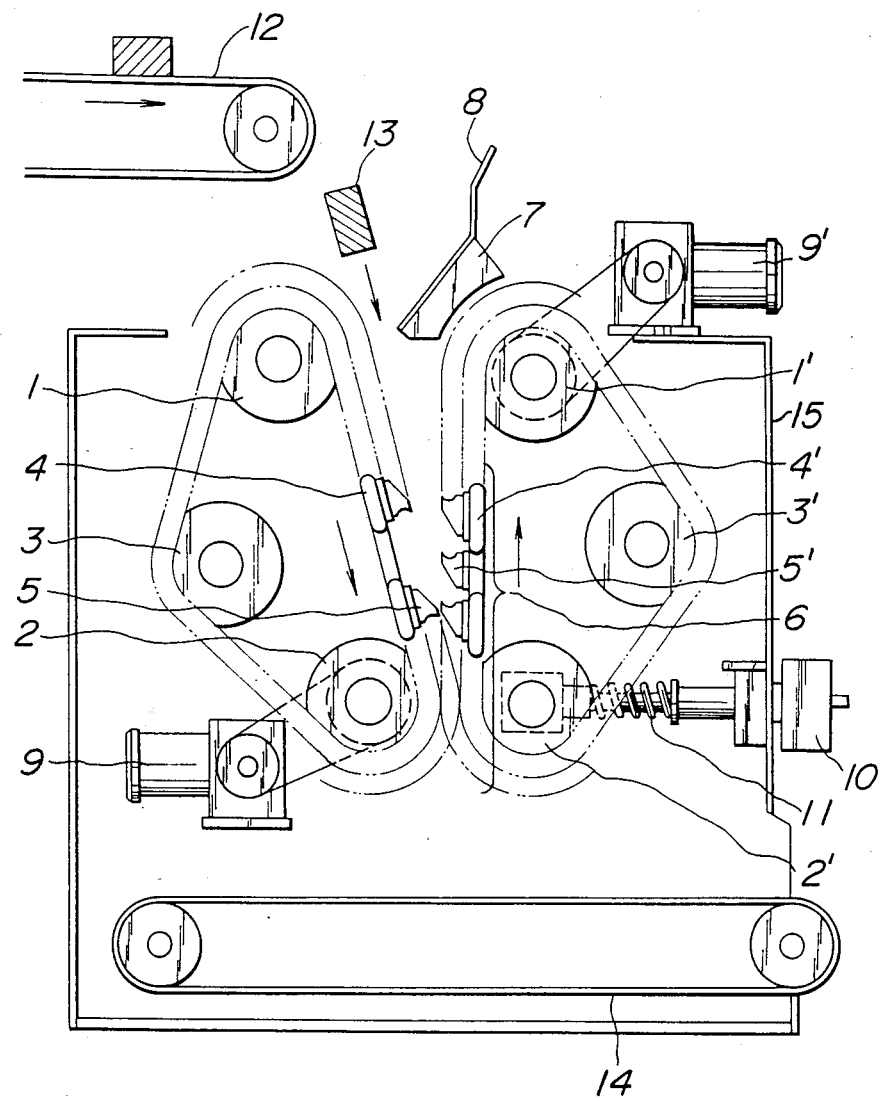
FIG. 1 is an explanatory view illustrating a preferred embodiment of a breaking apparatus according to the invention.

Referring to FIG. 1 illustrating a preferred embodiment of the breaking apparatus according to the invention, the apparatus comprises a pair of rotating wheel sets 1, 2 and 3 and 1', 2' and 3' of sprocket wheels, rollers or the like and an endless downward cutting rotating body 4 such as a crawler, belt, chain or the like extending about the rotating wheels 1, 2 and 3 and driven in a direction shown in an arrow in FIG. 1 which is the same as a feeding direction of materials to be broken and an endless upward cutting rotating body 4' similar to the body 4 but running in a direction opposite to the running direction of the body 4. A plurality of cutting blades 5 and 5' are fixed to the downward and upward cutting rotating bodies 4 and 4', respectively, all over circumferences of the rotating bodies. It is of course preferable that the cutting blades of the downward rotating body include downwardly sharp edges, respectively and the cutting blades of the upward rotating body include upward sharp edges, respectively.

The downward and upward cutting rotating bodies 4 and 4' upwardly widely diverge from each other in their opposing zone and the cutting blades 5 and 5' respectively fixed to the rotating bodies 4 and 4' are aligned with one another as viewed in a transverse direction but shifted from one another so as not to contact with one another in a cutting zone 6 in order to avoid damage to the blades.

Moreover, as shown in FIGS. 2a and 2b, the plurality of cutting blades 5 fixed to the downward cutting rotating body 4 are arranged all over the body spaced apart from each other with respective constant intervals in a longitudinal or rotating direction of the body 4 and in a transverse direction perpendicular to the rotating direction of the body 4.

The plurality of cutting blades 5' at least adjacent in the rotating direction fixed to the upward cutting rotating body 4' are arranged all over the body so as not to be aligned in rotating directions with one another. In this case, it is preferable for cutting efficiency that the distance in the rotating direction between the adjacent cutting blades 5' fixed to the upward rotating body 4' is about half of the distance in the rotating direction between the adjacent cutting blades 5 fixed to the downward rotating body 4.

In order to arrange the cutting blades 5 and 5' in alignment with one another as viewed in transverse direction but not contacting with each other in the cutting zone 6, the cutting blades 5' of the cutting rotating body 4' are arranged between the adjacent cutting blades 5 without contacting to each other. Moreover, in order to avoid constant distance between the adjacent cutting blades 5 and 5', the cutting blades 5' adjacent in the rotating direction are arranged so as not to be aligned with each other.

Moreover, stationary cutting blades 7 are fixed to a frame 8 above the upward cutting rotating body 4' so as to be aligned in a transverse direction with but so as not to contact the cutting blades 5' of the rotating body 4'. Motors 9 and 9' are provided to drive the cutting bodies 4 and 4', respectively such that the downward cutting rotating body 4' is driven at a faster speed than that of the upward cutting rotating body 4.

The rotating bodies 4 and 4' and other components above described are accommodated in a housing 15 on which side wall is provided a clearance adjusting device 10 for adjusting clearances between the cutting blades 5 and 5'. Between the wheel 2' and the adjusting device 10 is arranged a spring 11 for controlling retracting movements of the wheels 2' away from the wheels 2 depending upon sheets to be cut.

The wheels 3 and 3' apply tensile forces to the cutting rotating bodies 4 and 4' respectively to take any slack thereof. In any other tension adjusting mechanisms are provided, the wheels 3 and 3' may of course be dispensed with.

With the apparatus constituted as above described according to the invention, when the motors 9 and 9' are energized, the downward cutting rotating body 4 moves faster than the upward cutting rotating body 4' so that the cutting blades 5 move at higher speed than that of the cutting blades 5'. Accordingly, lumps of articles 13 to be broken such as soft synthetic resin or the like charged from a loading conveyor 12 would fall into the wide space between the upper portions of the cutting rotating bodies 4 and 4' to engage the cutting blades 5 running faster than the cutting blades 5' so as to be pulled by the blades 5 while being slightly cut. Thereafter, the further advancing lumps are subjected to action of the cutting blades 5' in opposition to and in conjunction with the cutting blades 5, so that the lumps are finely broken or cut so as to fall onto a discharging conveyor 14. It should be noticed in the process that the articles are satisfactorily finely broken or cut without joining in the form of bands or ribbons, because the cutting blades 5' adjacent in their rotating directions are not aligned with one another as shown in FIG. 2a.

Moreover, even if the lumps of the articles are not sufficiently broken before engaging the cutting blades 5', such lumps are then subjected to action of the stationary cutting blades 7 to be broken into fine pieces, so that all the articles are securely cut or broken and fall onto the discharging conveyor 14. Furthermore, even if there are foreign substances in the articles to be broken, which are too hard to be cut, the wheels 2' are forced to be retracted away from the wheels 2 by the foreign substances against the force of the spring 11 to prevent the apparatus from being fractured or damaged.

As can be seen from the above explanation, the sheet breaking apparatus is capable of securely and easily breaking or cutting fibrous or soft synthetic resin sheets or the like which would be difficult to be mechanically broken using the teachings in the prior art. The apparatus according to the invention is very useful for many industries because the apparatus is applicable to pretreatment for burning, reclaiming or regenerating waste materials.

It is further understood by those skilled in the art that the foregoing description is that of preferred embodiments of the disclosed apparatus and that various changes and modifications may be made in the invention without departing from the spirit and scope thereof.

What is claimed is:

1. A breaking apparatus for cutting and breaking plastic or fibrous sheet materials supplied to said apparatus, comprising;
    a pair of endless belt rotating cutting bodies having a plurality of cutting blades fixed respectively thereto;
    a first of said pair of rotating cutting bodies being driven in a downward direction, which is a feeding direction for sheet materials to be cut, at a speed faster than a speed of a second of said pair of rotating cutting bodies, said second rotating cutting body being driven in an upward direction, opposite the feeding direction of said sheet materials;
    a region of active cutting by said blades comprising a narrow V-shaped region between said pair of rotating cutting bodies, said rotating cutting bodies being arranged such that said cutting blades fixed to said rotating cutting bodies are somewhat separated from each other at upper portions of the region and closely aligned at a lower portion of the region, but laterally spaced from each other so that the cutting blades do not contact one another;
    said cutting blades fixed to said first rotating cutting body being arranged in rows extending substantially horizontally across a width of said first rotating cutting body, each row being spaced from its immediately adjacent row by an interval which is substantially equal to an interval that spaces any other row from its immediately adjacent row, each blade contained in a row being spaced from its immediately adjacent blade contained in that row by an interval which is substantially equal to an interval that spaces any other blade contained in any other row from its immediately adjacent blade contained in that same row, and each blade being in alignment with corresponding blades in the circumferentially adjacent rows, all of said blades of said first rotating cutting body being positioned to cut in said downward direction;
    said cutting blades fixed to said second rotating cutting body being arranged in rows extending substantially horizontally across a width of said second rotating cutting body, each row on said second rotating cutting body being spaced from its immediately adjacent row by an interval which is substantially one-half of the interval by which each row of said first rotating cutting body is spaced from its immediately adjacent row, each blade contained in a row of said second rotating cutting body being spaced from its immediately adjacent blade contained in that row by an interval which is substantially equal to an interval that spaces any other blade contained in any other row from its immediately adjacent blade contained in that same row, each blade on said second rotating cutting body being in non-alignment with the blades in immediately adjacent rows as viewed in the direction of rotation of said second rotating cutting body, and also each blade being in non-alignment with any blades on the first rotating cutting body, all of said blades of said second rotating cutting body being positioned to cut in said upward direction; and
    stationary cutting blades arranged above said second rotating body and aligned with said cutting blades of said second rotating cutting body to cut said sheet materials without contacting said cutting blades of said second rotating cutting body.

2. The breaking apparatus as set forth in claim 1, wherein said second rotating cutting body is supported by rotating wheels provided with clearance adjusting means for adjusting clearances between said cutting blades provided on said pair of rotating cutting bodies, and a spring for controlling retracting movements of said rotating wheels and for biasing said second rotating cutting body in a direction towards said first rotating cutting body to permit normal operation of said apparatus and to permit flexing of said second rotating cutting body in a direction away from said first rotating cutting body to allow hard foreign matter to pass through said apparatus.

* * * * *